United States Patent [19]

Das et al.

[11] Patent Number: 5,633,307
[45] Date of Patent: May 27, 1997

[54] AMBIENT TEMPERATURE CURING AQUEOUS COATING COMPOSITION BASED ON POLYUREA RESINS

[75] Inventors: Suryya K. Das, Fox Chapel Borough; Soner Kilic, Hampton Township, Allegheny County; Robert E. Jennings, New Sewickley Township, Beaver County; Stephen J. Thomas, Aspinwall Borough; Joseph M. Carney, Reserve Township, Allegheny County, all of Pa.

[73] Assignee: PPG Industries, Inc., Pittsburgh, Pa.

[21] Appl. No.: 357,488

[22] Filed: Dec. 16, 1994

[51] Int. Cl.[6] .............................. C08F 8/30; C08L 75/00
[52] U.S. Cl. .................... 524/460; 524/457; 524/589; 524/607; 524/608; 524/839; 524/846; 525/123; 525/452; 528/44; 528/68; 528/75
[58] Field of Search ........................ 525/123, 452; 528/44, 68, 75; 524/457, 460, 589, 607, 608, 839, 846

[56] References Cited

U.S. PATENT DOCUMENTS

| | | | |
|---|---|---|---|
| 3,996,154 | 12/1976 | Johnson et al. | 252/312 |
| 4,433,095 | 2/1984 | Hombach et al. | 524/563 |
| 4,472,550 | 9/1984 | Reiff et al. | 524/589 |
| 4,663,377 | 5/1987 | Hombach et al. | 524/196 |
| 4,798,745 | 1/1989 | Martz et al. | 427/407.1 |
| 4,798,746 | 1/1989 | Claar et al. | 427/407.1 |
| 4,909,915 | 3/1990 | Bederke et al. | 204/181.4 |
| 5,075,370 | 12/1991 | Kubitza et al. | 524/591 |
| 5,182,355 | 1/1993 | Martz et al. | 528/75 |
| 5,191,012 | 3/1993 | Markusch et al. | 524/591 |
| 5,194,487 | 3/1993 | Jacobs | 524/591 |
| 5,200,489 | 4/1993 | Jacobs et al. | 528/49 |
| 5,202,377 | 4/1993 | Thorne et al. | 524/591 |
| 5,252,696 | 10/1993 | Laas et al. | 528/49 |
| 5,296,160 | 3/1994 | Tirpak et al. | 524/591 |
| 5,300,556 | 4/1994 | Tirpak et al. | 524/591 |
| 5,358,997 | 10/1994 | Rosthauser et al. | 524/591 |
| 5,373,050 | 12/1994 | Morikawa et al. | 524/591 |
| 5,380,792 | 1/1995 | Renk | 524/840 |
| 5,389,718 | 2/1995 | Potter et al. | 524/591 |
| 5,389,720 | 2/1995 | Markusch et al. | 524/839 |
| 5,459,197 | 10/1995 | Schwindt et al. | 524/591 |

FOREIGN PATENT DOCUMENTS

| | | |
|---|---|---|
| 2085495 | 6/1993 | Canada . |
| 2088805 | 8/1993 | Canada . |
| 358979 | 9/1988 | European Pat. Off. . |
| 554747A2 | 2/1992 | European Pat. Off. . |
| 661320A1 | 12/1993 | European Pat. Off. . |
| 63-216070 | 12/1989 | Japan . |
| 1-216070 | 4/1991 | Japan . |

OTHER PUBLICATIONS

Chemical Abstracts, vol. 91, 1979, 142192, p. 70.

Primary Examiner—Paul J. Thibodeau
Assistant Examiner—Mary Critharis
Attorney, Agent, or Firm—Dennis G. Millman

[57] ABSTRACT

A two-component coating composition is disclosed wherein the binder components comprise: (a) an amino component comprising an aqueous solution and/or dispersion of at least one polyacrylate containing amino groups in a quantity sufficient to make said polyacrylate soluble and/or dispersible in water upon neutralization with acid; and (b) a polyisocyanate component containing free isocyanate groups. Also disclosed is the method of emulsifying component (b) into component (a).

19 Claims, No Drawings

AMBIENT TEMPERATURE CURING AQUEOUS COATING COMPOSITION BASED ON POLYUREA RESINS

BACKGROUND OF THE INVENTION

This invention relates to aqueous coating compositions based on two-component polyureas and to a process for their production.

It is generally desirable to use water based coatings instead of organic solvent based coatings for the sake of environmental considerations. However, the use of water instead of organic solvents in two-component isocyanate reactive coating compositions based on polyisocyanates containing free isocyanate groups has been hampered by the fact that isocyanate groups react not only with isocyanate reactive groups in the intended crosslinking reaction, but also with the water. Therefore, in a composition including a polyisocyanate, isocyanate reactive groups, and water, the isocyanate/water reaction takes place with formation of urea and carbon dioxide. This reaction not only fails to achieve the intended crosslinking of the isocyanate reactive groups, but also results in gassing or foaming of the composition due to the formation of carbon dioxide.

It was disclosed in U.S. Pat. No. 5,075,370 that it is possible to produce aqueous, two-component polyurethane coating compositions by using neutralized, acid group-containing polyhydroxy polymers, i.e. polyhydroxypolyacrylates, as dispersing agents for polyisocyanates containing free isocyanate groups. The polyisocyanates containing free isocyanate groups are emulsified in the aqueous, anionic polymer solution or dispersion. The coating compositions according to that patent are said to have a pot life of several hours and cure by way of isocyanate/hydroxyl group reaction to form polyurethane linkages.

SUMMARY OF THE INVENTION

The present invention is directed to aqueous, two-component coating compositions that contain as binder components:

(a) a polymeric component containing at least one polymer based on olefinically unsaturated compounds and containing isocyanate reactive primary or secondary amino groups and, optionally, hydroxyl groups; and (b) a polyisocyanate component containing polyisocyanate groups in amounts sufficient to provide an NCO/NH equivalent ratio of about 0.5:1 to 5:1. If the amino group-containing component includes hydroxyl groups as is optionally permitted, these ratios relate to the NCO/(NH+OH) equivalent ratio.

For the purposes of the present invention, a primary amino group is considered as an equivalent of two, and a secondary amino group is considered an equivalent of one. Thus, NH in the ratios above represents equivalents of amine hydrogen.

Component (a) is solubilized in water by acid neutralization of the amino groups, and the polyisocyanate component (b) is emulsified in component (a), optionally with the aid of a surfactant. Although acid has heretofore been considered a retardant to isocyanate curing reactions, the acid solubilized system of the present invention has surprisingly been found to provide rapid cure. Furthermore, the present invention exhibits reduced gassing from reaction with water and yields films having good water resistance.

The present invention also relates to a process for the production of this coating composition which is characterized in that the polyisocyanate component (b) is emulsified in an aqueous solution or dispersion of component (a) in a quantity which makes component (b) dispersible in water, the quantitative ratios between the two components corresponding to an NCO/NH equivalent ratio, or NCO/(NH+OH) if hydroxy groups are present, of 0.5:1 to 5:1 based on the isocyanate groups of the polyisocyanate component (b) and the incorporated primary or secondary amino groups and any hydroxy groups of the polymer component (a).

DETAILED DESCRIPTION

Component (a) is based on polymers of olefinically unsaturated monomers containing primary or secondary amino groups. These amino groups serve both as sites for partial neutralization by an acid to form cationic aqueous dispersions as well as curing sites for reaction with isocyanate groups of component (b) to form urea linkages. Optionally, the polymers of component (a) may also include hydroxyl groups, which upon curing with the isocyanate groups of component (b) form urethane linkages. The amino group-containing polymers of component (a) have a number average molecular weight ($M_n$), as determined by gel permeation chromatography, of about 500 to 50,000, preferably about 1,000 to 10,000. The amine content of component (a) is preferably 0.05 to 2.70 milliequivalents per gram, most preferably 0.25 to 1.62 milliequivalents per gram. In a particularly preferred embodiment, these cationic groups are acetic acid neutralized secondary amino groups.

The polymer resins are present in the aqueous medium in amounts of 10 to 50 percent by weight resin solids, preferably 20 to 40 percent by weight, and have a pH value of 4 to 6, preferably 5 to 5.5.

Depending upon the molecular weight of the polymers and their content of cationic groups, the aqueous systems containing the polymers may be either colloidal dispersions or molecular solutions.

The polymers containing amino groups are produced in the known manner by copolymerization of olefinically unsaturated monomers with monomers containing amino groups. The amino group containing polymer may optionally contain hydroxyl groups. After copolymerization, the amino groups are at least partially neutralized with an acid for inversion into the aqueous medium.

The amino groups contained in the copolymer are used for the purpose of salt formation by acid groups that either fully or partially neutralize the amino groups. In general, the amino comonomers are used in quantities of about 1 to 50 percent by weight, preferably in quantities of about 5 to 30 percent by weight, based on the total weight of the monomers used.

In principle, suitable amino comonomers are any olefinically unsaturated, polymerizable compounds which contain at least one primary or secondary amino group, e.g.: amino acrylates and amino methacrylates such as tert-butylaminoethyl methacrylate or meta-isopropenyl-$\alpha,\alpha$-dimethylbenzylamine. Amino groups can also be obtained by the reaction of acid polymers with aziridines such as ethylene imine, or by the reaction of epoxy and blocked ketimines, as well as other techniques known for adding amine functionality to polymers.

Monomers containing hydroxyl groups are not required in the present invention, but when used, may be included in the monomer mixture in such quantities that the amino group-containing polymers have a hydroxyl group content of 0 to 10 percent, preferably 0 to 5 percent by weight. In general, the hydroxy functional comonomers are used in quantities of about 0 to 50 percent by weight, preferably 0 to 30 percent by weight based on the total weight of monomers used to copolymerize the amino group-containing polymer of component (a).

Suitable monomers containing hydroxyl groups include, in particular, hydroxyalkyl esters of acrylic acid or methacrylic acid preferably containing 2 to 4 carbon atoms in the alkyl radical such as 2-hydroxyethyl acrylate or methacrylate, 2- or 3-hydroxypropyl acrylate or methacrylate, the isomeric hydroxybutyl acrylates or methacrylates and mixtures of such monomers.

The third group of olefinically unsaturated monomers which may be used for the production of the copolymers of component (a) are olefinically unsaturated compounds which contain neither amino nor hydroxyl groups. These compounds include esters of acrylic acid or methacrylic acid containing from 1 to 18, preferably from 1 to 8, carbon atoms in the alcohol radical, such as methyl acrylate, ethyl acrylate, isopropyl acrylate, n-propyl acrylate, n-butyl acrylate, 2-ethylhexyl acrylate, n-stearyl acrylate, and tertiary amine containing acrylates, and the methacrylates corresponding to these acrylates. Also included are styrene, alkyl substituted styrenes, acrylonitrile, methacrylonitrile, vinyl acetate, vinyl stearate and mixtures of such monomers. The monomers of this third group are used in quantities of 50 to 90 percent by weight, preferably about 40 to 80 percent by weight, based on the total weight of the monomers used.

The polymers may be produced by standard polymerization processes. The polymers are preferably produced in organic solution. The polymerization reaction is free radically initiated when the monomer mixture is added together with an initiator mixture over a period of about 1 to 10 hours, preferably about 3 to 6 hours, at reaction temperature. Thereafter more activator may optionally be added to take the polymerization to a conversion of at least 99 percent.

Suitable solvents for the amino group-containing polymer are characterized by their solubility toward the polymer and their ability to be azeotropically distilled off during the inversion to the aqueous medium. These may include alcohols such as ethanol, propanol, and butanol; aromatic hydrocarbons such as benzene, toluene, xylene and chlorobenzene; esters such as ethyl acetate, butyl acetate, methyl glycol acetate, ethyl glycol acetate and methoxypropyl acetate; ethers such as butyl glycol, tetrahydrofuran, dioxane and ethyl glycol ether; ketones such as acetone and methyl ethyl ketone; halogen-containing solvents such as methylene chloride and trichloromonofluoroethane; and mixtures of these solvents.

The polymerization may be initiated by initiators commercially available for this purpose. In general, the copolymerization reaction takes place at temperatures in the range previously set forth, preferably at a temperature of about 50° to 160° C. under atmospheric pressure. The exact polymerization temperature is determined by the type of initiator and solvent used. The initiators are used in quantities of about 0.05 to 10 percent by weight, based on the total quantity of monomers.

Suitable initiators include aliphatic azo compounds such as azoisobutyronitrile and peroxides such as dibenzoyl peroxide, t-butyl perpivalate, t-butyl per-2-ethylhexanoate, t-butyl perbenzoate, t-butyl hydroperoxide, di-t-butyl peroxide, cumene hydroperoxide and dicyclohexyl and dibenzyl peroxydicarbonate.

The molecular weight of the polymers may be regulated by standard regulators such as n-dodecylmercaptan, diisopropyl xanthogene disulfide, di-(methylene-trimethylolpropane)-xanthogene disulfide and thioglycol. They are added in quantities of up to about 3 percent by weight, based on the monomer mixture.

On completion of polymerization, the copolymers are converted into an aqueous solution or dispersion. The acid is introduced into the polymerization solution, followed by addition of water. Then the organic solvent is removed by azeotropic distillation. Fugitive acids are preferred for the neutralization, i.e., those that will escape from the coating as it cures, thereby avoiding interference with the cure. Fugitive acids are generally organic acids, preferred among which are acetic acid, propionic acid, lactic acid, and trifluoroacetic acid. However, within the broad aspects of the invention, inorganic acids could also be employed, such as carbonic acid, phosphoric acid and sulfuric acid, of which fugitive carbonic acid is preferred. Other organic and inorganic acids are well known in the art and may be used for neutralization in the present invention.

The polyisocyanate component (b) may be any polyisocyanate containing aliphatically, cycloaliphatically, araliphatically and/or aromatically bound isocyanate groups which are liquid at room temperature. The polyisocyanate component is preferably not modified to be water dispersible or soluble, although it may be so modified in a less preferred embodiment. The polyisocyanate component (b) is preferably a polyisocyanate or polyisocyanate mixture exclusively containing aliphatically and/or cycloaliphatically bound isocyanate groups and having an average NCO functionality of about 2.0 to 5.0.

If necessary, the polyisocyanates may be used in admixture with small quantities of inert solvents to reduce the viscosity. However, the maximum quantity in which such a solvent is used is such that the coating compositions contain at most 20 percent by weight of solvent, based on the quantity of water and any solvent that may still present in the polymer dispersions or solutions. Suitable solvents for the polyisocyanates include aromatic hydrocarbons such as solvent naphtha, acetates, or the solvents set forth as suitable for the polymerization of component (a).

Suitable polyisocyanates include those containing aromatically or (cyclo)aliphatically bound isocyanate groups, (cyclo)aliphatic polyisocyanates being particularly preferred. Particularly suitable are polyisocyanates based on hexamethylene diisocyanate, 1-isocyanato-3,3,5-trimethyl-5-isocyanatomethyl cyclohexane (IPDI) and/or bis-(isocyanatocyclohexyl)-methane, particularly those based on hexamethylene diisocyanate. Other suitable polyisocyanates based on these diisocyanates may include the biuret, urethane, uretdione and/or isocyanurate derivatives of these diisocyanates which, after their production, have been freed in the known manner, preferably by distillation, from excess starting diisocyanate to a residual content of less than 0.5 percent by weight. Aliphatic polyisocyanates for use in accordance with the invention include biuret polyisocyanates based on hexamethylene which are based on mixtures of N,N',N"-tris-(6isocyanatohexyl)biuret with small quantities of its higher homologs. These polyisocyanates may be obtained by the processes according to U.S. Pat. Nos. 3,124,605; 3,358,010; 3,903,126; 3,903,127 or 3,976,622. Also preferred are the cyclic trimers of hexamethylene diisocyanate corresponding to the criteria mentioned above which may be obtained in accordance with U.S. Pat. No. 4,324,879 and which are based on N,N'N"-tris-(6-isocyanatohexyl)-isocyanurate in admixture with small quantities of its higher homologs.

The aromatic polyisocyanates which may also be used in accordance with the invention, but are less preferred, are based on 2,4-diisocyanatotoluene or commercial mixtures thereof with 2,6-diisocyanatotoluene or based on 4,4'-diisocyanatodiphenylmethane or mixtures thereof with its isomers and/or higher homologs. Aromatic polyisocyanates of this type include the urethane isocyanates obtained by the reaction of excess quantities of 2,4-diisocyanatotoluene with polyhydric alcohols such as trimethylolpropane and subsequent removal of the unreacted diisocyanate excess by distillation. Other aromatic polyisocyanates include the trimers of the previously mentioned monomeric diisocyanates which have also been freed from excess monomeric diisocyanates, preferably by distillation, after their production.

To prepare the ready-to-use coating compositions, polyisocyanate component (b) is emulsified in an aqueous dispersion of amino group-containing polymer component (a). The dissolved or dispersed polymer simultaneously serves as an emulsifier for the polyisocyanate added. Optionally, dispersing component (b) may be assisted by a separate surfactant. Mixing may be carried out by simple stirring at room temperature. The quantity of the polyisocyanate component is selected to provide an NCO:NH equivalent ratio{or NCO:(NH+OH) equivalent ratio if hydroxyl functionality is present}, based on the isocyanate groups of component (b) and the primary and secondary amino groups and hydroxyl groups of component (a), of about 0.5:1 to 5:1, preferably about 0.8:1 to 2:1.

Before polyisocyanate component (b) is added, additives typically used in coating technology may be incorporated into polymer component (a). The additives include foam inhibitors, leveling aids, pigments, dispersion aids for pigments, etc.

The coating compositions according to the invention thus obtained are suitable for virtually any applications where high performance is desired. They are particularly useful for coating of metal surfaces and various plastic surfaces.

The invention is further illustrated but is not intended to be limited by the following examples in which all parts and percentages are by weight unless otherwise specified.

EXAMPLE 1

The following initial charge and feeds were used in the preparation of aqueous secondary amine functional acrylic polymer via solution polymerization technique.

| Ingredients | Parts by Weight |
|---|---|
| Initial Charge | |
| Isopropanol | 650.0 |
| Feed 1 | |
| Isopropanol | 565.0 |
| n-Butyl acrylate | 273.5 |
| Methyl methacrylate | 783.5 |
| Tert-butylaminoethyl methacrylate | 364.5 |
| Styrene | 401.0 |
| VAZO-67[1] | 91.0 |
| Feed 2 | |
| Acetic acid | 88.5 |
| Feed 3 | |
| Deionized water | 5425.0 |

[1] 2,2'-Azobis(2-methylbutanenitrile) initiator commercially available from E. I. du Pont de Nemours and Company, Wilmington, Delaware.

The initial charge was heated in a reactor with agitation to reflux temperature (81° C.). Then Feed 1 was added in a continuous manner over a period of 3 hours. At the completion of Feed 1, the reaction mixture was held at reflux for 3 hours. The resultant acrylic polymer had a total solids content of 59.8 percent determined at 110° C. for one hour and number average molecular weight of 4833 as determined by gel permeation chromatography (GPC) using polystyrene as standard.

Following the polymerization, Feed 2 was added over 10 minutes at room temperature with agitation. After the completion of the addition of Feed 2, Feed 3 was added over 15 minutes. Then the reaction mixture was heated for azeotropic distillation of isopropanol. When the distillation temperature reached 99°–100° C., the distillation continued two more hours and then the reaction mixture was cooled to room temperature. The total distillate collected was 2545 grams. After filtration the final aqueous dispersion had a solid content of 31.5 percent and pH of 5.32.

EXAMPLE 2

The following initial charge and feeds were used in the preparation of aqueous secondary amine and hydroxyl functional acrylic polymer via solution polymerization technique.

| Ingredients | Parts by Weight |
|---|---|
| Initial Charge | |
| Isopropanol | 130.0 |
| Feed 1 | |
| Isopropanol | 113.0 |
| Methyl methacrylate | 134.9 |
| n-Butyl acrylate | 47.4 |
| Tert-butylaminoethyl methacrylate | 72.9 |
| Styrene | 72.9 |
| 2-Hydroxyethyl methacrylate | 36.5 |
| VAZO-67 | 18.2 |
| Feed 2 | |
| Acetic acid | 17.7 |
| Deionized water | 1085.0 |

The initial charge was heated in a reactor with agitation to reflux temperature (81° C.). Then Feed 1 was added in a continuous manner over a period of 3 hours. At the completion of Feed 1, the reaction mixture was held at reflux for 3 hours. The resultant acrylic polymer had a total solids content of 61.7 percent determined at 110° C. for one hour and rottuber average molecular weight of 4792 as determined by GPC using polystyrene as standard.

Following the polymerization, Feed 2 was added at room temperature with agitation. After the completion of the addition of Feed 1, the reaction mixture was heated for azeotropic distillation of isopropanol. When the distillation temperature reached to 100° C., the distillation continued about one and half more hours and then the reaction mixture was cooled to room temperature. The total distillate collected was 561 grams. The final aqueous dispersion had a solid content of 29.1 percent, isopropanol content of less than 0.01 percent, and pH of 5.42.

EXAMPLE 3

The following initial charge and feeds were used in the preparation of aqueous hydroxyl functional acrylic polymer (containing tertiary amine groups) via solution polymerization.

| Ingredients | Parts by Weight |
|---|---|
| Initial Charge | |
| Isopropanol | 650.0 |
| Feed 1 | |
| Isopropanol | 565.0 |
| Methyl methacrylate | 583.0 |
| n-Butyl acrylate | 237.0 |
| N,N-Diethylaminoethyl methacrylate | 273.5 |
| Styrene | 364.5 |
| 2-Hydroxyethyl methacrylate | 364.5 |
| VAZO-67 | 91.0 |
| Feed 2 | |
| Acetic acid | 66.5 |
| Feed 3 | |
| Deionized water | 5757.5 |

The initial charge was heated in a reactor with agitation to reflux temperature (81° C.). Feed 1 was added in a substantially continuous manner over a period of 3. At the completion of Feed 1, the reaction mixture was held at reflux for 3 hours. The resultant acrylic polymer had a total solids content of 62.64 percent determined at 110° C. for one hour and number average molecular weight of 8882 as determined by GPC using polystyrene as standard.

Following the polymerization, Feed 2 and 3 were added at room temperature with agitation. Then the reaction mixture was heated for azeotropic distillation of isopropanol. When the distillation temperature reached to 99° C., the distillation continued two more hours and then the reaction mixture was cooled to room temperature. The total distillate collected was 2172 grams. The final aqueous dispersion had a solid content of 28.5 percent and pH of 4.78.

The acrylate resins of Examples 1, 2, and 3 were formulated into two-component coating compositions for the purposes of evaluation as follows.

EXAMPLE A

| Component | Weight Percent | |
|---|---|---|
| Package 1 | | |
| Amino acrylate resin of Example 1 | 40.38 | |
| Dispersant[1] | 0.37 | |
| Thickener[2] | 0.35 | |
| Defoamer[3] | 0.11 | |
| Exxate 900 solvent[4] | 2.20 | |
| n-Propanol[5] | 0.18 | |
| Deionized water | 20.63 | |
| Carbon black[6] | 0.04 | |
| Magnesium silicate hydrate[7] | 9.62 | |
| Barium sulfate[8] | 9.94 | |
| Titanium dioxide pigment[9] | 11.32 | |
| Sub Total | | 95.14 |
| Package 2 | | |
| Isocyanate resin[10] | 2.74 | |
| Emulsifier[11] | 1.15 | |
| Exxate 900 solvent | 0.97 | |
| Sub Total | | 4.86 |
| Total | | 100.00 |

[1]Solsperse ® 27000 - Hyperdispersant available from ICI Surfactants, Wilmington, Delaware.

| Component | Weight Percent | |
|---|---|---|
[2]DSX-1514 - Thickener available from Henkel, Kankakee, Illinois.
[3]Dee Fo ® 97-3 - Defoamer available form Ultra Additives, Inc., Paterson, New Jersey.
[4]Exxate ® 900 - Solvent available from Exxon Chemical Co., P.O. Box 2180, Houston, Texas.
[5]n-Propanol - Solvent available from Eastman Chemical Products, Inc., Kingsport, Tennessee.
[6]Raven ® 410 - Carbon black pigment available from Cities Service Co., Columbian Div., Akron, Ohio.
[7]Microtalc ® MP-12-50 - Magnesium silicate hydrate available from Whittaker, Clark, & Daniel Inc., South Plainfield, New Jersey.
[8]Barimite XF ® - Barium sulfate available form Cyprus Industrial Mineral Co., Cartersville, Georgia.
[9]Ti-Pure ® R902-38 - Titanium dioxide pigment available from E. I. du Pont de Nemours & Co., Wilmington, Delaware.
[10]Desmodur ® N 3200 - A hexamethylene diisocyanate biuret available from Miles Inc., Pittsburgh, Pennsylvania.
[11]Emulsifier - a nonionic surfactant containing 33.1 percent T-1890 (an isophorone diisocyanate available from Huls America, Piscataway, New Jersey), 11.0 percent Carbowax ® 750ME (a monofunctional polyether surfactant from Union Carbide Chemicals and Plastic Co., Charleston, West Virginia), 55.9 percent Igepal ® CO-530 (a nonionic surfactant available from Rhone-Poulenc, Cranbury, New Jersey), prepared in methyl ethyl ketone and Proglyde DMM (dipropylene glycol dimethoxy ether, available from Dow Chemical Co., Midland, Michigan).

EXAMPLE B

| Component | Weight Percent | |
|---|---|---|
| Package 1 | | |
| Amino hydroxy acrylate resin of Example 2 | 38.38 | |
| Solsperse 27000 | 0.37 | |
| DSX-1514 | 0.35 | |
| Dee Fo 97-3 | 0.11 | |
| Exxate 900 | 1.15 | |
| n-Propanol | 0.18 | |
| Deionized Water | 21.39 | |
| Raven 410 | 0.04 | |
| Microtalc MP-12-50 | 9.58 | |
| Barimite XF | 9.89 | |
| Ti-Pure R902-38 | 11.26 | |
| Sub Total | | 92.70 |
| Package 2 | | |
| Desmodur N 3200 | 4.11 | |
| Emulsifier | 1.73 | |
| Exxate 900 | 1.46 | |
| Sub Total | | 7.30 |
| Total | | 100.00 |

EXAMPLE C

| Component | Weight Percent |
|---|---|
| Package 1 | |
| Hydroxy acrylate resin of Example 3 | 41.15 |
| Solsperse 27000 | 0.37 |
| DSX-1514 | 0.35 |
| Dee Fo 97-3 | 0.11 |
| Exxate 900 | 0.94 |
| Ektasolve EB Acetate | 0.64 |
| n-Propanol | 0.18 |
| Deionized Water | 18.87 |
| Raven 410 | 0.04 |
| Microtalc MP-12-50 | 9.65 |

-continued

| Component | Weight Percent | |
|---|---|---|
| Barimite XF | 9.97 | |
| Ti-Pure R902-38 | 11.35 | |
| Sub Total | | 93.62 |
| Package 2 | | |
| Desmodur N 3200 | 3.59 | |
| Emulsifier | 1.51 | |
| Exxate 900 | 1.28 | |
| Sub Total | | 6.38 |
| Total | | 100.00 |

Each of the coating formulations of Examples A, B, and C were tested for performance by application onto a substrate prepared as follows:

The substrate for each example was 32 gauge steel panels with a zinc phosphate pretreatment (available from Advanced Coating Technologies, Inc., Hillsdale, Mich.; as cold roll steel B952 P60 DIW, polish) primed with an epoxy-polyamide metal primer, DP-40/DP-401 (a metal primer made by mixing 1 volume DP-40 epoxy primer with 1 volume DP-401 epoxy primer catalyst, both available from PPG Industries, Inc., Pittsburgh, Pa.). The primed substrates were air-dried under ambient conditions for at least 1 hour before the example coatings were applied.

The coating compositions of the examples were prepared as two-package compositions with the functional acrylic, pigments, and additives in one package (Package 1) and the isocyanate, isocyanate emulsifier, and solvent in a second package (Package 2). In an appropriate grinding vessel, Package 1 was prepared by mixing the pigments into the resinous vehicle components under high speed agitation with a Cowles blade. After stirring for 5 minutes the Cowles blade was replaced with an Impellar blade, and zircoa beads were then added. This mix was stirred at high speed for 1 hour, after which the beads were separated from the grind paste. The isocyanate package was prepared by blending the isocyanate, isocyanate emulsifier, and solvent into a separate container, which was hand-shaken until a homogeneous solution resulted.

Before spray application, the Package 2 was added to Package I with slow and constant agitation. Each of the compositions of the examples was applied by air-atomized spray at 45 pounds per square inch over the previously prepared substrates. Each coated substrate was air-dried under ambient conditions for 1 hour. Then each was dry-sanded with P400 grit sandpaper (P400-213Q, Imperial Wetordry® production paper, "A" weight, available from 3M, St. Paul, Minn.) immediately and, if necessary, at every succeeding hour interval. The time at which the example coating was observed to be sandable, i.e., when it did not foul the sandpaper, was taken to be the minimum required time after application until sandable. Wet-sanding, i.e., with sandpaper and panel wetted with water before abrading, was performed after each substrate dried at ambient conditions for 1 hour. A pass or fail rating for the wet sanding test was determined by the resistance of the example coating to degradation, i.e., softening or dissolving of the coating due to solvency of the water toward the coating.

Each two-component coating composition example was additionally subjected to a test for gassing potential. Immediately after each spray application, the remaining portion of each blended composition, approximately 85 to 100 grams, was sealed in a ½ pint container. Each sample container was opened at 1 hour intervals and was evaluated for gas-pressure buildup by observing for an audible hissing of pressurized gas, an audible popping of the lid, or bubbling or foaming of the wet sample. The results of each of these performance tests are set forth in Table 1.

TABLE 1

| | EXAMPLE A | | EXAMPLE B | | EXAMPLE C | |
|---|---|---|---|---|---|---|
| | Dry | Wet | Dry | Wet | Dry | Wet |
| SANDING | | | | | | |
| 1.) 1 hr. | Pass | Pass | Pass | Pass | Fail[2] | Fail[3] |
| 2.) 2 hr. | N.A.[1] | N.A. | N.A. | N.A. | Fail | N.A. |
| 3.) 3 hr. | N.A. | N.A. | N.A. | N.A. | Fail | N.A. |
| 4.) 4 hr. | N.A. | N.A. | N.A. | N.A. | Fail | N.A. |
| 5.) 24 hr. | N.A. | N.A. | N.A. | N.A. | Pass | N.A. |
| GASSING | | | | | | |
| 1.) 1 hr. | Pass | | Pass | | Pass | |
| 2.) 2 hr. | Pass | | Pass | | Pass | |
| 3.) 3 hr. | Pass | | Pass | | Fail[4], bubbling | |
| 4.) 24 hr. | Pass | | Pass | | N.A. | |

[1] N.A., or "not applicable," indicates no further testing was needed.
[2] A "fail" rating under dry sanding indicates fouling of the sandpaper due to embedding of coating in the grit.
[3] A "fail" rating under wet sanding indicates dissolution of the coating due to its sensitivity to the solvency of the water.
[4] A "fail" rating in the gassing test indicates bubbling of the wet sample due to gas evolvement.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component coating composition wherein the binder components comprise:

(a) an aqueous dispersion of at least one polyacrylate, said polyacrylate containing amino groups at least partially neutralized with fugitive acid in a quantity sufficient to make said polyacrylate dispersible in water, said amino groups being present in sufficient quantity to serve as the primary reaction sites for crosslinking; and (b) a polyisocyanate crosslinking component containing free isocyanate groups;

wherein components (a) and (b) are present in quantities corresponding to an NCO:NH equivalent ratio of 0.5:1 to 5:1, based on free NCO groups, and component (b) is present in emulsified form in component (a).

2. The coating composition of claim 1 wherein the polyacrylate of component (a) additionally includes hydroxyl functionality, and components (a) and (b) are present in quantities corresponding to an NCO:(NH+OH) equivalent ratio of 0.5:1 to 5:1.

3. The coating composition of claim 1 wherein the amino groups in component (a) are at least partially neutralized with acetic acid.

4. The coating composition of claim 1 wherein the polyacrylate of component (a) consists essentially of the polymerization product of ethylenically unsaturated monomers free of hydroxyl functionality.

5. The coating composition of claim 1 wherein the polyacrylate of component (a) consists essentially of the polymerization product of ethylenically unsaturated monomers free of acid functionality.

6. The coating composition of claim 1 wherein the amino group content of the polyacrylate of component (a) is 0.05 to 2.70 milliequivalents per gram of polyacrylate.

7. The coating composition of claim 1 wherein the amino group content of the polyacrylate of component (a) is 0.25 to 1.62 milliequivalents per gram of polyacrylate.

8. The coating composition of claim 1 wherein the polyacrylate of component (a) is the reaction product of monomers of which 1 to 50 percent by weight are amino group containing monomers.

9. The coating composition of claim 1 wherein the polyacrylate of component (a) is the reaction product of monomers of which 5 to 30 percent by weight are amino group containing monomers.

10. The coating composition of claim 1 wherein the polymeric content of component (a) consists essentially of said polyacrylate.

11. The coating composition of claim 1 wherein the amino groups in component (a) are at least partially neutralized with a fugitive acid selected from the group consisting of acetic acid, proprionic acid, trifluoroacetic acid, and carbonic acid.

12. A process for the production of a two-component coating composition which comprises emulsifying a polyisocyanate component containing free isocyanate in an aqueous dispersion of at least one polyacrylate, said polyacrylate containing amino groups at least partially neutralized with fugitive acid in a quantity sufficient to make said polyacrylate dispersible in water, said amino groups being present in sufficient quantity to serve as the primary reaction sites for crosslinking, wherein the polyisocyanate component and the amino component are present in quantities corresponding to an NCO:NH equivalent ratio of 0.5:1 to 5:1.

13. The process of claim 12 wherein said polyacrylate additionally includes hydroxyl functionally wherein the polyisocyanate component and the amino component are present in quantities corresponding to an NCO:(NH+OH) equivalent ratio 0.5:1 to 5:1.

14. The process of claim 12 wherein the amino groups in the amino component are at least partially neutralized with acetic acid.

15. The process of claim 14 wherein the acid is acetic acid.

16. The process of claim 12 wherein the polyacrylate consists essentially of the polymerization product of ethylenically unsaturated monomers free of hydroxyl functionality.

17. The process of claim 12 wherein the polyacrylate consists essentially of the polymerization product of ethylenically unsaturated monomers free of acid functionality.

18. The process of claim 12 wherein the polyacrylate of the amino component is the reaction product of monomers of which 1 to 50 percent by weight are amino group containing monomers.

19. The process of claim 12 wherein the amino groups in the amino component are at least partially neutralized with a fugitive acid selected from the group consisting of acetic acid, proprionic acid, trifluoroacetic acid, and carbonic acid.

* * * * *